US009025961B2

(12) United States Patent
Murayama et al.

(10) Patent No.: US 9,025,961 B2
(45) Date of Patent: May 5, 2015

(54) CONTENT SUPPLYING SYSTEM WHICH USES SPATIAL LIGHT TRANSMISSION
(71) Applicant: Outstanding Technology Co., Ltd., Tokyo (JP)
(72) Inventors: Fumitaka Murayama, Tokyo (JP); Hiroyuki Kurokawa, Tokyo (JP); Hiroki Narusawa, Tokyo (JP)
(73) Assignee: VLC Co., Ltd., Naha-shi (JP)
( * ) Notice: Subject to any disclaimer, the term of this patent is extended or adjusted under 35 U.S.C. 154(b) by 218 days.
(21) Appl. No.: 13/685,848
(22) Filed: Nov. 27, 2012
(65) Prior Publication Data
US 2013/0343762 A1 Dec. 26, 2013
(30) Foreign Application Priority Data
Jun. 22, 2012 (JP) ................................. 2012-141046
(51) Int. Cl.
*H04B 10/116* (2013.01)
*H04B 10/114* (2013.01)
(52) U.S. Cl.
CPC .......... *H04B 10/116* (2013.01); *H04B 10/1141* (2013.01); *H04B 10/1149* (2013.01)
(58) Field of Classification Search
CPC ........... H04B 10/1141; H04B 10/1149; H04B 10/116
USPC ................................................. 398/127, 130
See application file for complete search history.

(56) References Cited

U.S. PATENT DOCUMENTS

| 5,020,155 A | 5/1991 | Griffin et al. |
| 5,796,351 A | 8/1998 | Yabuki |
| 8,613,559 B2 * | 12/2013 | Tong et al. ........................ 385/77 |
| 2003/0185005 A1 | 10/2003 | Sommers et al. |
| 2005/0276610 A1 | 12/2005 | Hirayama |
| 2006/0056855 A1 | 3/2006 | Nakagawa et al. |
| 2006/0067707 A1 * | 3/2006 | Maniam et al. ............... 398/183 |
| 2009/0132073 A1 | 5/2009 | Hsu |
| 2009/0171571 A1 * | 7/2009 | Son et al. ...................... 701/208 |

FOREIGN PATENT DOCUMENTS

| JP | 11-024619 A | 1/1999 |
| JP | 2006-50528 A | 2/2006 |
| KR | 10-2005-0003481 A | 1/2005 |
| KR | 10-2011-0109993 A | 10/2011 |
| WO | 02/25842 A2 | 3/2002 |

OTHER PUBLICATIONS

Extended European Search Report dated Sep. 10, 2013, issued in corresponding European Patent Application No. 13166426.0.
Korean Office Action dated Jan. 31, 2014, in corresponding Korean Patent Application No. 10-2013-0003896 with English Translation. (10 pages).

* cited by examiner

*Primary Examiner* — Nathan Curs
(74) *Attorney, Agent, or Firm* — Westerman, Hattori, Daniels & Adrian, LLP

(57) ABSTRACT

A spatial light transmitter of a content supplying system stores ID information of its own and emits spatial light on which the ID information is superimposed from a light emitting portion. A spatial light receiver is used by being connected to a handheld terminal and receives spatial light emitted from the spatial light transmitter. When a user carries the handheld terminal and moves close to the spatial light transmitter, the spatial light receiver receives spatial light emitted from the spatial light transmitter, and ID information obtaining means of the spatial light receiver obtains the ID information which is superimposed on spatial light from a light receiving signal of the light receiving portion, thereby outputting the ID information to the handheld terminal. Alternatively, the ID information obtaining means of the handheld terminal obtains the ID information on the basis of the light receiving signal, and the handheld terminal reproduces the content selected on the basis of the ID information.

9 Claims, 13 Drawing Sheets

CONTENT SUPPLYING SYSTEM WHICH USES SPATIAL LIGHT TRANSMISSION

BACKGROUND OF THE INVENTION

1. Field of the Invention

The present invention relates to a content supplying system which is used in providing users with content in public facilities, etc., and in particular to a content supplying system which uses spatial light transmission for transmitting ID information (identification information), with the information superimposed on spatial light, thereby providing the users with the content selected on the basis of the ID information.

2. Description of Related Art

Conventionally, there is so far known an audio guide system disclosed in JP H11-24619 A as a system which uses, for example, infrared data communication to provide visitors at public facilities and the like with an audio guide such as information on facilities, explanation of exhibits on display and guidance of the facilities.

The conventional audio guide system is equipped with a recorder portion which records an audio signal, an FM transmitting circuit in which the audio signal reproduced from the recorder portion is subjected to frequency modulation (FM) and an infrared emitting portion which superimposes a transmitting signal output from the FM transmitting circuit on an infrared ray to emit the infrared ray. The audio guide system is installed at various areas such as a variety of exhibition sites in facilities.

Further, each audio guide system is provided with an infrared ray sensor for detecting humans and constituted so that visitors at facilities are given an infrared ray FM receiver to receive an audio guide. The audio guide system is used in such a manner that when a visitor having the infrared ray FM receiver comes close to the audio guide system, the infrared ray sensor detects the visitor and the audio guide system superimposes the audio guide on an infrared ray to transmit it to the FM receiver, by which the visitor listens to the audio guide through the FM receiver.

However, where the above-described conventional audio guide system is installed, for example, at a plurality of places in various types of facilities such as a gymnasium, a municipal hall, a museum and an art gallery, the audio guide is different depending on each place in various types of facilities. It is, therefore, necessary to prepare a record portion which records audio guide data thereof and allow an audio guide system at each installation place to store the data. Further, construction work is also necessary for installing these individual audio guide systems at various installation places. Thus, additional time and labor are necessary in the construction work for installation, which poses a problem.

Further, for example, in the case of a museum or an art gallery, an audio guide system is installed for each exhibit on display. And, the audio guide system requires a change of the audio guide every time exhibits on display are changed. However, as with the above case, it is necessary to store the thus changed audio guide data in each audio guide system. For this type of work additional time and labor are required and this poses a problem.

SUMMARY OF THE INVENTION

An object of the present invention is to provide a content supplying system which uses spatial light transmission which is capable of simply and conveniently providing users with necessary content through handheld terminals in a plurality of places such as various facilities on the basis of transmission of ID information by spatial light. The object of the present invention can be attained by a content supplying system which uses spatial light transmission which has a configuration given below.

That is, in order to attain the above-described object, the content supplying system which uses spatial light transmission of the present invention is constituted with a spatial light transmitter which is provided with an ID information storage portion for storing ID information of its own and also provided with a light emitting portion for emitting spatial light on which the ID information is superimposed; a handheld terminal which is provided with content storing means for storing content information so as to correspond to the ID information and also provided with content reproducing means for reproducing content read from the content storing means as text, images, video or sounds; and a spatial light receiver which is connected to the handheld terminal and provided with a light receiving portion for receiving spatial light emitted from the light emitting portion of the spatial light transmitter. ID information obtaining means for obtaining the ID information which is transmitted by being superimposed on spatial light from a light receiving signal of the light receiving portion is installed at the spatial light receiver or the handheld terminal. This content supplying system is constituted in such a manner that when a user carries the handheld terminal and moves close to the spatial light transmitter, the light receiving portion of the spatial light receiver receives spatial light emitted from the spatial light transmitter, the ID information obtaining means obtains the ID information which is superimposed on spatial light from the light receiving signal of the light receiving portion, and the content reproducing means of the handheld terminal reproduces the content selected on the basis of the ID information.

Here, the spatial light is a concept which includes visible light, infrared light (infrared ray) and ultraviolet light (ultraviolet ray). The above-described content information is a concept which includes a main body of content information such as text, sounds and video, a main body of application software information, control information such as information on activation of application software and a URL (Uniform Resource Locator) of content reference information on a server to be referenced which provides text, sounds, video or application software.

Further, the content storing means stores the content information in such a storage mode that includes a storage state that is temporarily stored on access to the server to be referenced like a case where the content information is the URL of content reference information and a storage mode which temporarily stores the main body of content information for reproduction such as display.

According to the present invention, where many exhibits on display are arranged in large facilities such as an art gallery and explanation content (audio guide) on these exhibits on display is provided to users and when the user carrying a handheld terminal comes close to each of the exhibits on display, explanation content on an exhibit on display is selected and reproduced on the basis of ID information which is superimposed on spatial light and then transmitted. Therefore, explanation content and the like on individual exhibits on display can be automatically provided to the user through the handheld terminal. Further, information to be transmitted to a spatial light receiver of each handheld terminal from the spatial light transmitter by using spatial light is to be only the ID information. Thus, as compared with a case that the content information is transmitted as it is, the spatial light transmitter and the spatial light receiver can be both downsized by simplifying a circuit configuration. Further, they are short in transmission time and less likely to be influenced by noise, etc., on transmission and also able to quickly provide appropriate content.

Still further, only ID information may be stored at each spatial light transmitter to transmit the ID information from the light emitting portion by using spatial light. It is, therefore, possible to install a spatial light transmitter simple in configuration near each exhibit on display and the like, by which many spatial light transmitters can be installed at necessary sites quite simply and conveniently. In addition, where exhibits on display, etc., are changed, the change can be made only by changing the content which is stored at content storing means of the handheld terminal so as to correspond to the ID information. This can be made to respond simply and conveniently.

Here, the above-described content information is stored at a content server on a network so as to correspond to the above-described ID information. And, the handheld terminal can be constituted in such a manner that it accesses the content server to collect content information and stores the content information at the content storing means so as to correspond to the ID information.

Thereby, for example, where exhibits on display are changed in an art gallery and the like and explanation content of the exhibit on display is changed accordingly, a management computer, etc., can be used to access the content server on the network, thereby uploading the content corresponding to the ID information in order to make the change. Upon a change in the content, a handheld terminal is able to access the content server, downloading content after a change or take in the content into the content storing means and easily provide a user with the changed content.

Further, where content information corresponding to the ID information is, for example, application software for advertisement of merchandise (for demonstration) and stored at the content server, the handheld terminal accesses the content server on the network upon obtaining the ID information and downloads the application software for advertisement. Thereby, the handheld terminal is able to automatically reproduce thereon, such as video images for advertisement.

Still further, the above-described content information can be stored at the content server on the network so as to correspond to the ID information as control information such as information on activation of application software which operates on the handheld terminal. In this instance, the handheld terminal obtains the control information from the content server on the basis of the ID information, thereby controlling activation and the like of the application software operating inside the handheld terminal on the basis of the control information.

Where the control information on application software corresponding to ID information is, for example, activation information on telephone directory software for making phone calls to a specific person, upon obtaining the ID information, the handheld terminal obtains the activation information on telephone application software from the content server on the basis of the ID information, thereby automatically activating the telephone directory software. Then, the handheld terminal is able to make phone calls to a specific person. Further, where the control information on application software corresponding to the ID information is, for example, activation information of information for activating map display software which displays shop locations and the like, upon obtaining the ID information, the handheld terminal obtains from the content server the information for activating the application software which displays a map on the basis of the ID information, thereby automatically activating the map display software. Then, the handheld terminal is able to display the shop locations and the like.

In addition, the above-described content information can be stored at the content server on the network as a URL of content reference information so as to correspond to the ID information. In this instance, the handheld terminal obtains the URL of content reference information from the content server according to the ID information, accesses another server to be referenced on the network on the basis of the URL of content reference information, thus making it possible to collect and reproduce a main body of content information such as images and video from the server to be referenced, for example.

On the other hand, it is preferable that a USB (Universal Serial Bus) port is installed at the spatial light receiver. In this instance, the spatial light receiver is connected to the handheld terminal by way of a USB, and when the ID information obtaining means of the spatial light receiver receives ID information transmitted by being superimposed on spatial light from the spatial light transmitter, the spatial light receiver is able to send the ID information to the handheld terminal through the USB port.

Thereby, the spatial light receiver can be easily connected to the handheld terminal by way of the USB. As hardware, an existing handheld terminal having a USB connector can be used simply and conveniently as it is.

Further, another embodiment is available in which there can be provided on a spatial light receiver a light receiving circuit which inputs a light receiving signal of a light receiving portion and an output terminal which outputs the light receiving signal from the light receiving circuit. In this instance, the spatial light receiver is used by connecting an output terminal thereof to a microphone input terminal of a handheld terminal. And, the ID information obtaining means installed at the handheld terminal takes in a light receiving signal which contains ID information sent by being superimposed on spatial light through the microphone input terminal, thereby extracting and obtaining the ID information from the light receiving signal. Thereby, the spatial light receiver can be constituted only with the light receiving portion and the light receiving circuit, by which the spatial light receiver can be downsized to a remarkable extent. The ID information obtaining means can be constituted with software which is installed at the handheld terminal.

Still further, the above-described spatial light transmitter is constituted so that a light emitting portion for emitting spatial light from a light emitting element is installed at the leading end of a main body case. Inside the main body case, there are disposed a light emission driving circuit for activating the light emitting element so as to emit light; an ID information storage portion for storing ID information on the spatial light transmitter or an installation place thereof in advance; a transmission signal reproducing portion which modulates a carrier wave by an information signal which contains at least the ID information to reproduce a transmission signal, thereby outputting the signal to the light emission driving circuit; and a power source circuit which inputs electricity supplied through a screw fitting of an electric bulb as a power-source input portion to supply direct-current electricity to the light emission driving circuit and the transmission signal reproducing portion. And, as the power-source input portion, the screw fitting of the electric bulb can be attached to an end of the main body case.

According to the present invention, many spatial light transmitters can be installed quite simply and conveniently and also connected to power sources at necessary sites, for example, public facilities for providing content such as various types of guidance only by conducting simple construction work for installing an electric bulb socket used for lighting as well and by screwing a screw fitting of the spatial light transmitter into the electric bulb socket.

Further, the above-described transmission signal reproducing portion can be constituted so as to have a carrier wave oscillator which oscillates a high-frequency signal of a carrier wave and a modulation portion which modulates the carrier wave by an information signal which contains ID information. Thereby, the carrier wave is modulated by the information signal which contains ID information to reproduce a transmission signal, by which the transmission signal can be transmitted by being superimposed on spatial light.

Still further, the spatial light receiver can be housed inside the handheld terminal. It is, thereby, possible to form the spatial light receiver integrally with the handheld terminal so that the spatial light receiver does not project outside the handheld terminal.

In addition, the spatial light transmitter is housed inside a liquid crystal display device having a light element light source on a liquid crystal panel, and the light element light source of the liquid crystal display device can be used as a light emitting element of a projector of the spatial light transmitter. In this instance, there is supplied to the light emission driving circuit of the light element light source a transmission signal in which ID information read from the ID information storage portion which stores the ID information of its own is modulated, and visible light irradiated from the light element light source is emitted, with the transmission signal superimposed thereon. The above-described light element light source may use an LED or an organic EL or the like which irradiates white light as back light.

According to the present invention, in the liquid crystal display device which is installed for displaying various types of images, text, video and the like at event sites, etc., for example, visible light is irradiated, with ID information superimposed, from the light element light source of the liquid crystal panel thereof. Therefore, it is not necessary to install spatial light transmitters individually. And, a user just places the handheld terminal in front of the liquid crystal display device, by which the ID information can be taken in through the spatial light receiver into the handheld terminal. Then, the user is provided with content such as description of merchandise and video for explanation, depending on the ID information.

As described so far, according to the content supplying system which uses spatial light transmission of the present invention, it is possible to provide users with necessary content simply and conveniently through the handheld terminal on the basis of ID information transmitted by spatial light in a plurality of places such as various facilities.

DESCRIPTION OF THE PREFERRED EMBODIMENTS

Figure 1:
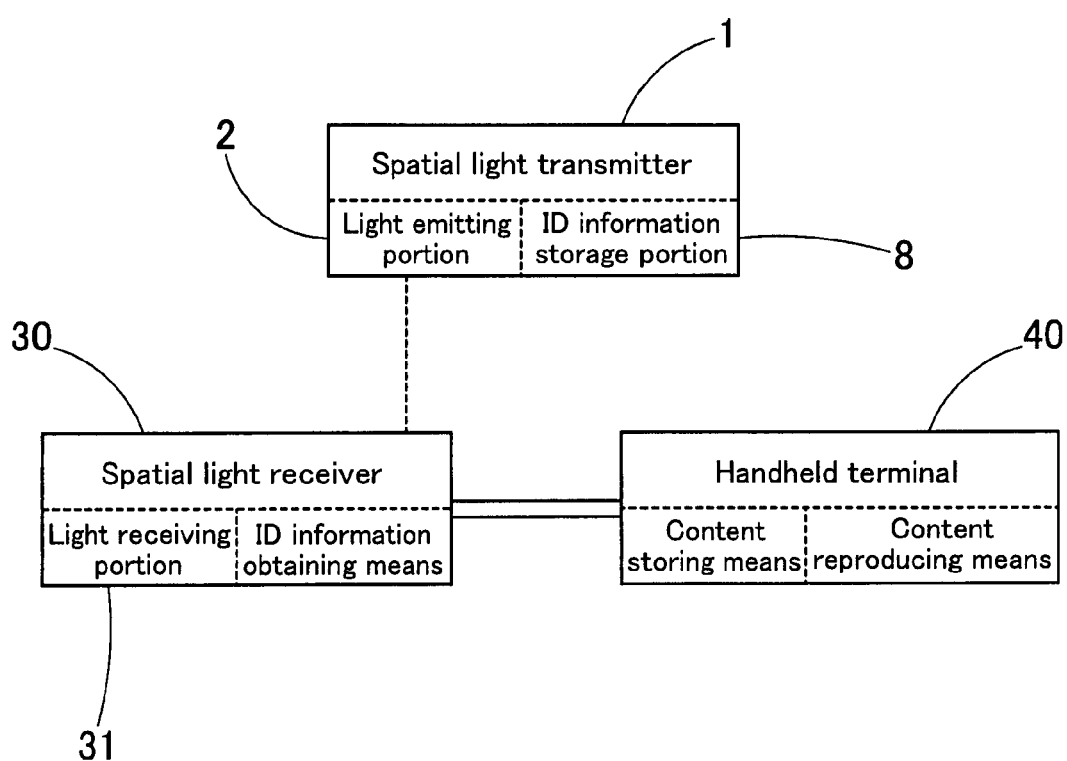
FIG. 1 is a configuration diagram which shows a content supplying system as one embodiment of the present invention.
Figure 2:
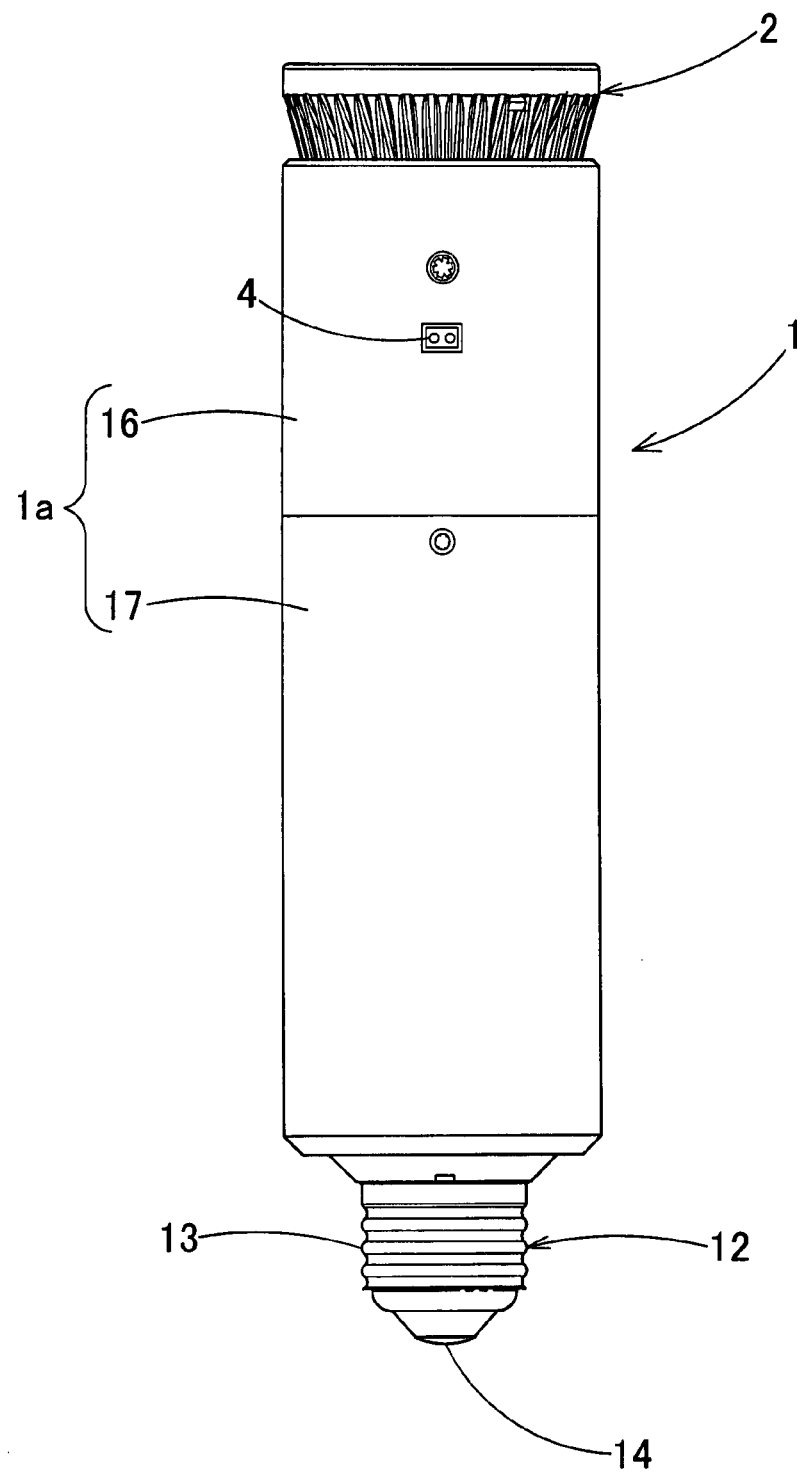
FIG. 2 is a front view which shows a spatial light transmitter for spatial light transmission used in the content supplying system.
Figure 3A:
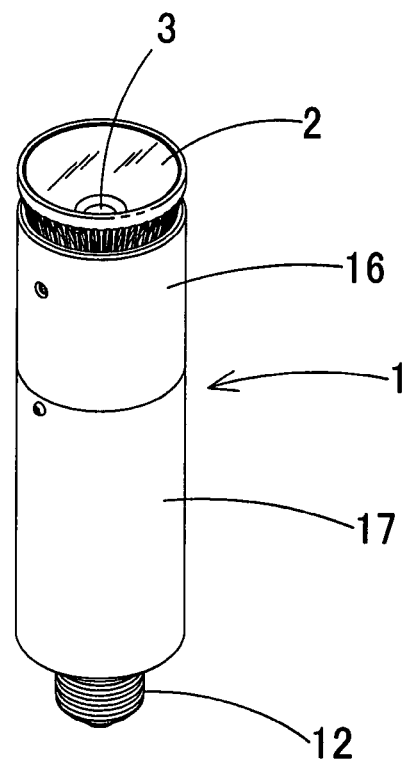
FIG. 3A is a perspective view of the spatial light transmitter taken from obliquely above and FIG. 3B is a perspective view thereof taken from obliquely below.
Figure 3B:
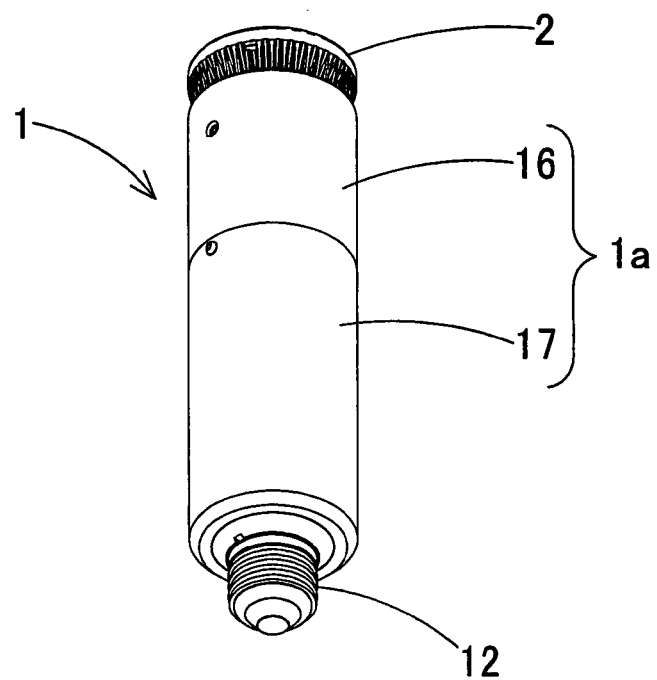
Figure 4:
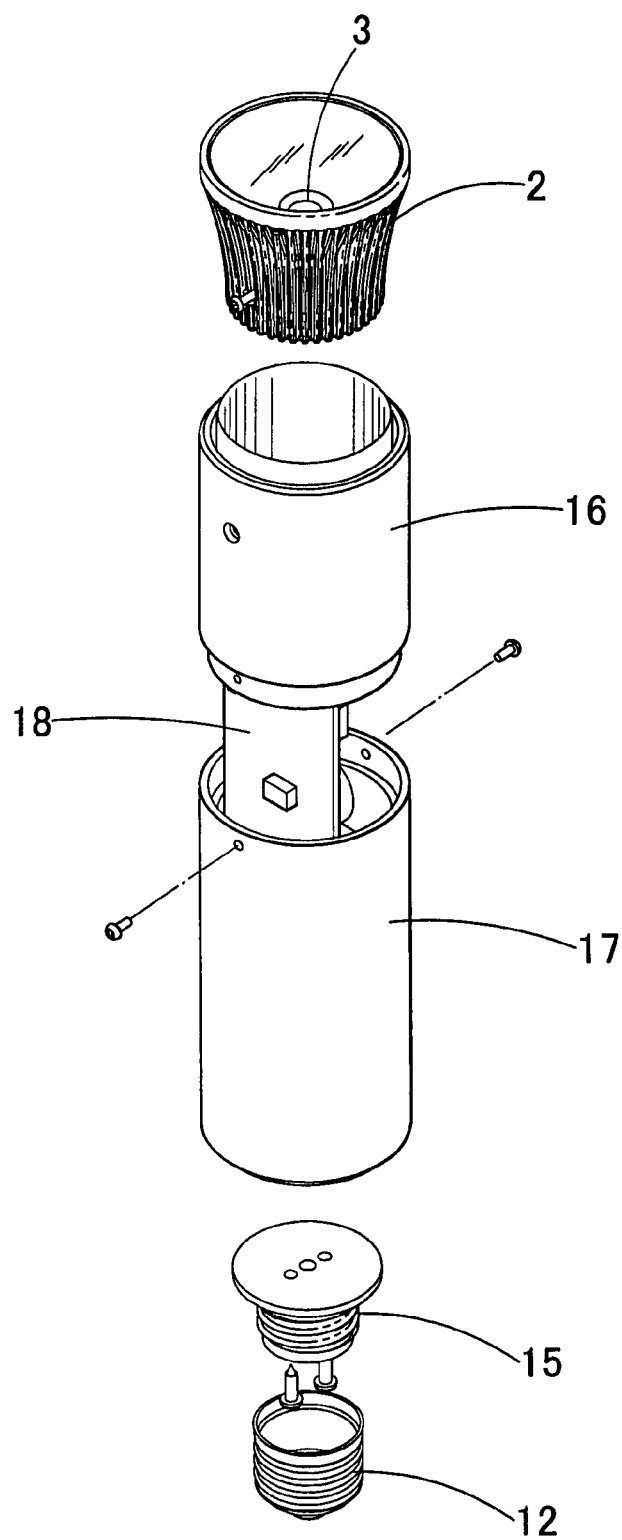
FIG. 4 is an exploded perspective view of the spatial light transmitter.

Hereinafter, a description will be given of the present invention on the basis of the embodiment shown in the drawings. The present invention shall not be limited to the embodiment, and any changes within requirements of claims and equivalents concerning the requirements shall be included in the scope of the claims.

This content supplying system is a system for providing a user with explanation content and the like on exhibits on display through a handheld terminal 40, for example, in an art gallery or a museum and the like. As shown in FIG. 1, the system is constituted with; a spatial light transmitter 1 which is installed in a plurality of places, provided with an ID information storage portion 8 for storing the ID information of its own (identification information) and also provided with a light emitting portion 2 for emitting spatial light on which the ID information is superimposed; the handheld terminal 40 which is provided with content storing means for storing a plurality of content information so as to correspond to the ID information and also provided with content reproducing means for reproducing content read from the content storing means as text, images, video and sounds, and a spatial light receiver 30 which is connected to the handheld terminal 40 and provided with a light receiving portion 31 for receiving spatial light emitted from the light emitting portion 2 of the spatial light transmitter 1 and ID information obtaining means for demodulating and obtaining the ID information transmitted by being superimposed on spatial light from a light receiving signal of the light receiving portion 31.

In this content supplying system, the light receiving portion 31 of the spatial light receiver 30 receives spatial light emitted from the spatial light transmitter 1 when a user carries the handheld terminal 40 and moves close to the spatial light transmitter 1 installed, for example, above each exhibit on display and the like. The ID information obtaining means of the spatial light receiver 30 demodulates and obtains the ID information which is superimposed on spatial light from the light receiving signal of the light receiving portion 31 and sends the ID information to the handheld terminal 40. The content reproducing means of the handheld terminal 40 reproduces the content selected on the basis of the input ID information.

In the spatial light transmitter 1 which emits spatial light to perform spatial light transmission, as shown in FIG. 2 to FIG. 5, a main body case 1*a* thereof is formed in the shape of an electric bulb having a light emitting portion 2 at the leading end thereof, and a circuit necessary for visible light communication as spatial light transmission is housed inside the main body case 1a. The spatial light transmitter 1 is installed in the vicinity of each exhibit on display, for example, in an art gallery or a museum and the like, that is, at places where explanation content is provided to users. The spatial light transmitter 1 is formed in the shape of an electric bulb so as to make simple construction work for installation and also so as to be installed simply and harmoniously as a lighting fixture as well.

The spatial light transmitter 1 is provided with the main body case 1a formed in the shape of an electric bulb. The light emitting portion 2 for emitting spatial light from a light emitting element 3 is installed at the leading end of the main body case 1a, and a screw fitting 12 is installed at the terminal end thereof as a screw fitting/power source input portion. Thereby, the spatial light transmitter 1 is installed at a installation place such as inside facilities, for example, at a place where explanation content (audio guide) is provided. And, the spatial light transmitter 1 is structured so as to be easily attached via the screw fitting 12 into an electric-bulb socket connected to an alternative-current power source.

Figure 5:
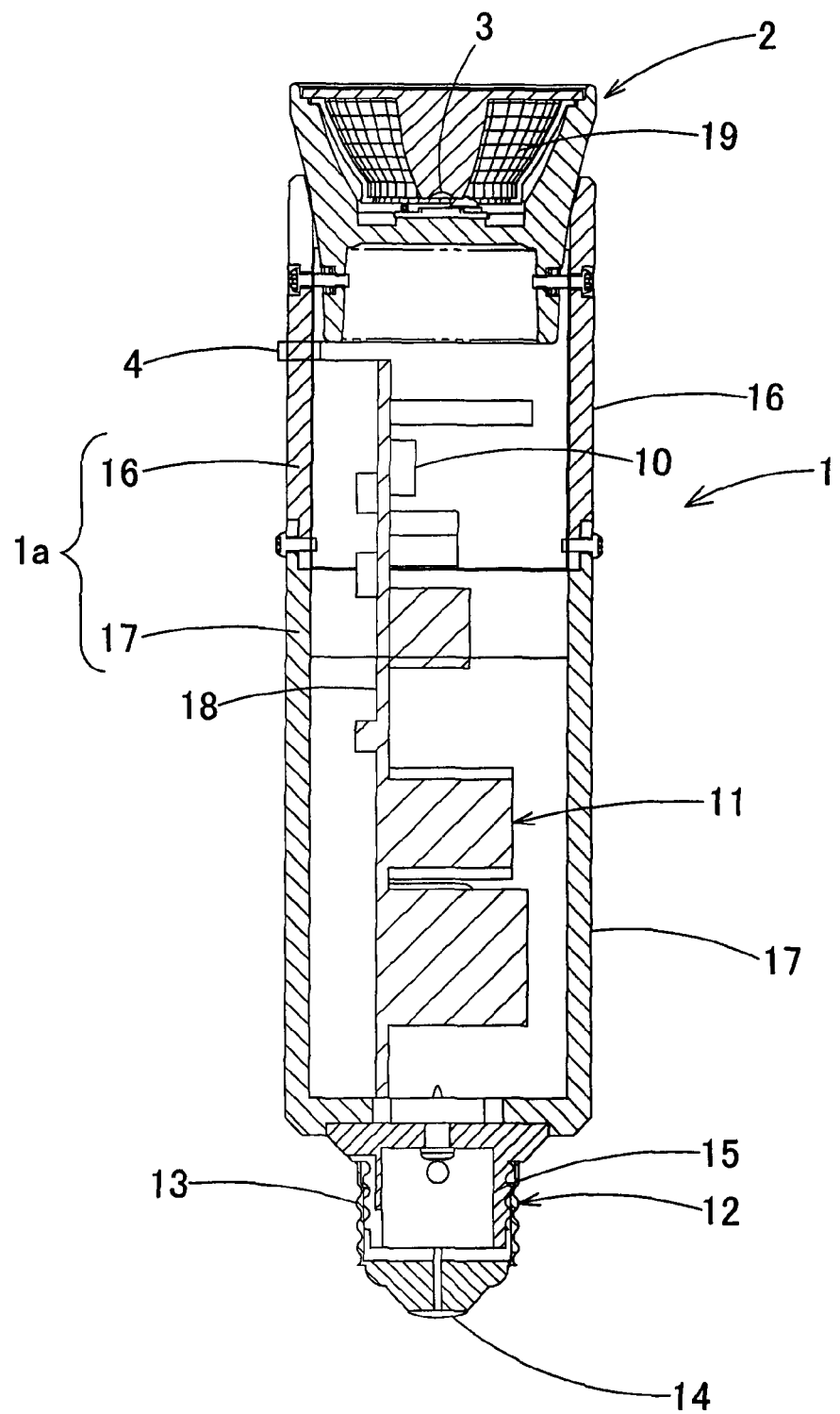
FIG. 5 is a longitudinal sectional view of the spatial light transmitter.

As the light emitting element 3 of the light emitting portion 2, there is used, for example, a visible light emitting diode which emits white light. As shown in FIG. 5, an LED module thereof is installed at the center of a cup-shaped reflector 19, and the front face of the light emitting portion 2 is covered with a transparent plate. And, as will be described later, visible light on which a transmission signal including ID information and arbitrary information such as model information is superimposed is irradiated forward. Visible light irradiated from the light emitting element 3 of the light emitting portion 2 is to be emitted to the vicinity of exhibits on display from above in an angle range of 10 to 20 degrees, for example.

As the light emitting element 3, for example, a white-light emitting diode is used to constitute a spatial light transmitter for visible light communication as a device. There can also be used an infrared-ray light emitting diode which emits infrared rays (near-infrared light). In this instance, this diode emits invisible near-infrared light, which is included in spatial light transmission.

The main body case 1a is composed of an upper case 16 formed in the shape of a cylinder and a lower case 17 connected to a lower part of the upper case 16. In this example, the main body case 1a is divided by the upper case 16 and the lower case 17 but can also be formed integrally.

Figure 6:
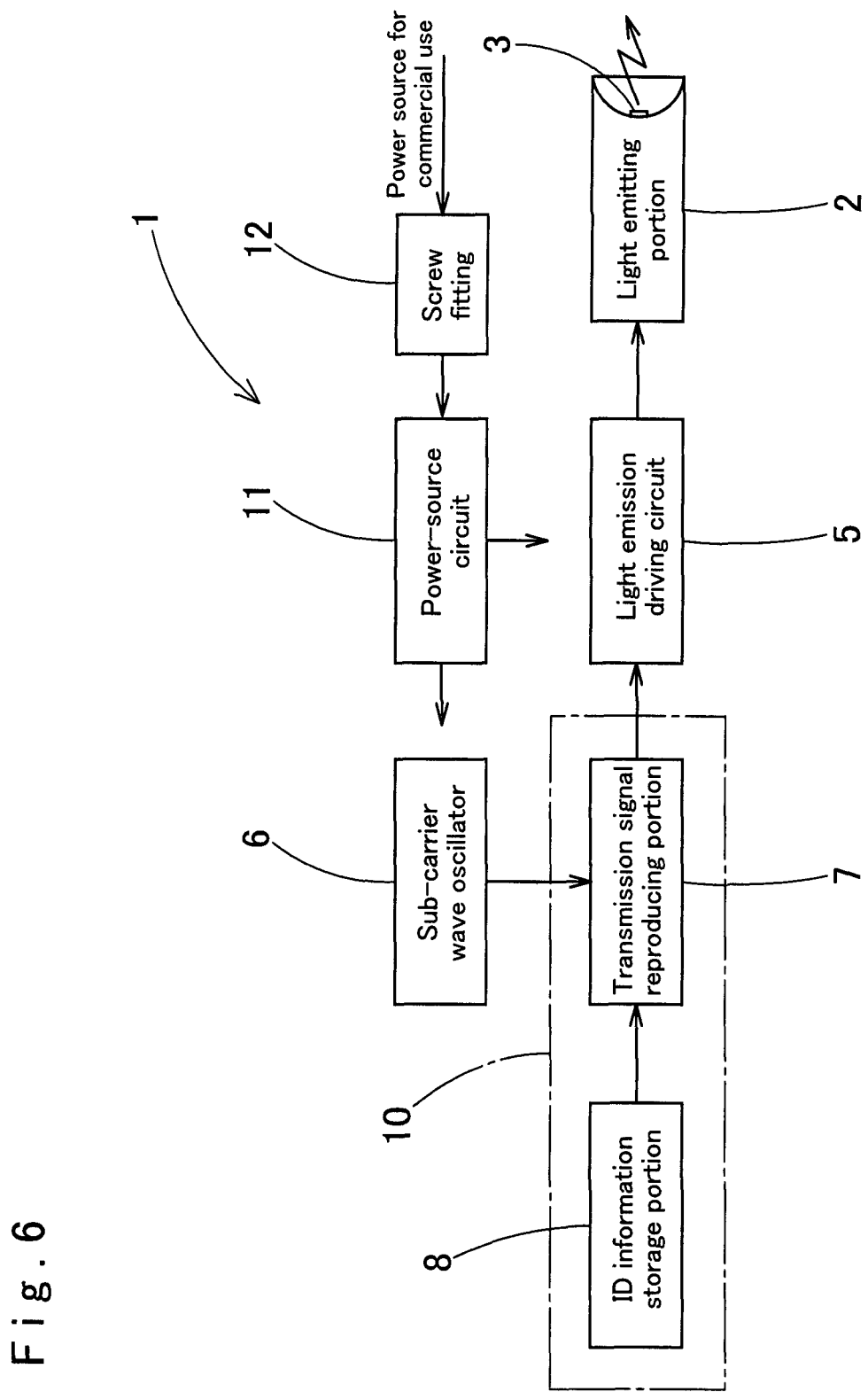
FIG. 6 is a configuration block diagram which shows circuits of the spatial light transmitter.

The light emitting portion 2 is fixed at an upper part of the upper case 16. As shown in FIG. 6, there are housed inside the upper case 16, a light emission driving circuit 5 which emits and activates the light emitting element 3, a sub-carrier wave oscillator 6 which oscillates and outputs, for example, a 28.8 kHz sub-carrier wave, a transmission signal reproducing portion 7 which modulates the sub-carrier wave by an information signal containing ID information of the spatial light transmitter 1 to reproduce a transmission signal, thereby outputting the signal to the light emission driving circuit 5, and an ID information storage portion 8 which stores in advance the ID information of the spatial light transmitter 1. The sub-carrier wave oscillator 6 which oscillates and outputs the sub-carrier wave is named in a case where the transmission medium of light is given as a main carrier wave. Also, it is simply a carrier wave oscillator which oscillates and outputs a carrier wave.

A power source circuit 11 which serves as a power source of the circuit is housed in the lower case 17. The power source circuit 11 is configured with an AC/DC converter which converts an alternative-current power source such as a commercial-use power source to direct currents with a predetermined voltage. The alternative-current power source is supplied from the screw fitting 12 arranged at the terminal end of the main body case 1a. A switching inverter circuit is used in the AC/DC converter, and the circuit small in dimension is used to convert alternative-currents of the commercial-use power source to direct currents of DC 12V, for example.

The screw fitting 12 is constituted with a shell portion 13 serving as a screw portion and an eyelet portion 14 which is attached below at the center of the shell portion 13 via an insulating material 15. One input terminal of the power source circuit 11 is connected internally to the eyelet portion 14, while the other input terminal is connected internally to the shell portion 13. This screw fitting 12 is formed as a screw fitting which is standardized as E17, E18, E26, etc., and made so as to be screwed into a predetermined electric-bulb socket and easily attached. The screw fitting 12 as the fitting portion/power source input portion is provided with the screw-type shell portion 13. However, for example, a cylinder attaching/connecting member other than a screw-type shell portion may also be usable.

The transmission signal reproducing portion 7 and the ID information storage portion 8 is constituted with a one-chip type microcomputer 10 and constituted so that the sub-carrier wave signal is modulated on the basis of program data stored in advance, for example, by 4-ary PPM (pulse position modulation) according to the ID information of the spatial light transmitter 1, thereby outputting the modulated sent transmission signal to the light emission driving circuit 5. As shown in FIG. 5, the one-chip type microcomputer 10, the sub-carrier wave oscillator 6 and the light emission driving circuit 5 are loaded into a circuit substrate 18 inside the main body case 1a.

The ID information storage portion 8 is a storage portion which stores ID information (identification number) on various spatial light transmitters 1 used in the content supplying system and also a storage portion which writes ID information for identifying places where the various spatial light transmitters 1 are installed. The ID information storage portion 8 is able to store any additional information together with the ID information.

Figure 7:
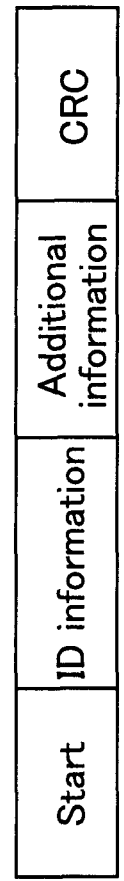
FIG. 7 is a configuration diagram which shows a data frame.

As shown in FIG. 7, the transmission signal reproducing portion 7 of the microcomputer 10 prepares a data frame and reproduces the data frame of a transmission signal so that in continuation of a start frame composed of a preamble and a frame type, for example, data of the ID information and model information is arranged as payload and CRC (cyclic redundancy code) for checking is arranged as an end frame.

Further, the transmission signal reproducing portion 7 is constituted in such a manner that a sub-carrier wave input from the sub-carrier wave oscillator 6 is subjected to 4-ary PPM (pulse position modulation) by using data of the above-described data frame, that is, data which contains ID information on devices, etc., to output an information transmission signal. A 4-ary PPM circuit divides data to be transmitted into a 2 bit unit, generating a pulse which identifies a code position according to four pieces of 2 bit data so that, for example, "00", "01", "10" and "11" are respectively given as "1000", "0100", "0010" and "0001". And, the circuit operates so that the sub-carrier wave is modulated by the data pulse thereof. Thereby, the PPM circuit is to irradiate visible light having constant luminance, irrespective of the data to be transmitted.

In the transmission signal reproducing portion 7, the sub-carrier wave is subjected to 4-ary PPM by the information transmission signal to reproduce a transmission signal. However, ASK modulation, FSK modulation or PSK modulation and the like can be carried out to reproduce the transmission signal. Alternatively, it is acceptable that without modulation of carrier waves, an information transmission signal is pulsed by a base band method and the pulsed transmission signal is superimposed on spatial light and transmitted.

The light emission driving circuit 5 is configured so that a modulated information transmission signal sent from the transmission signal reproducing portion 7 of the microcomputer 10 is input and the light emitting element 3 of the light emitting portion 2 is driven to emit visible light and also the information transmission signal is superimposed on the visible light.

Figure 8:
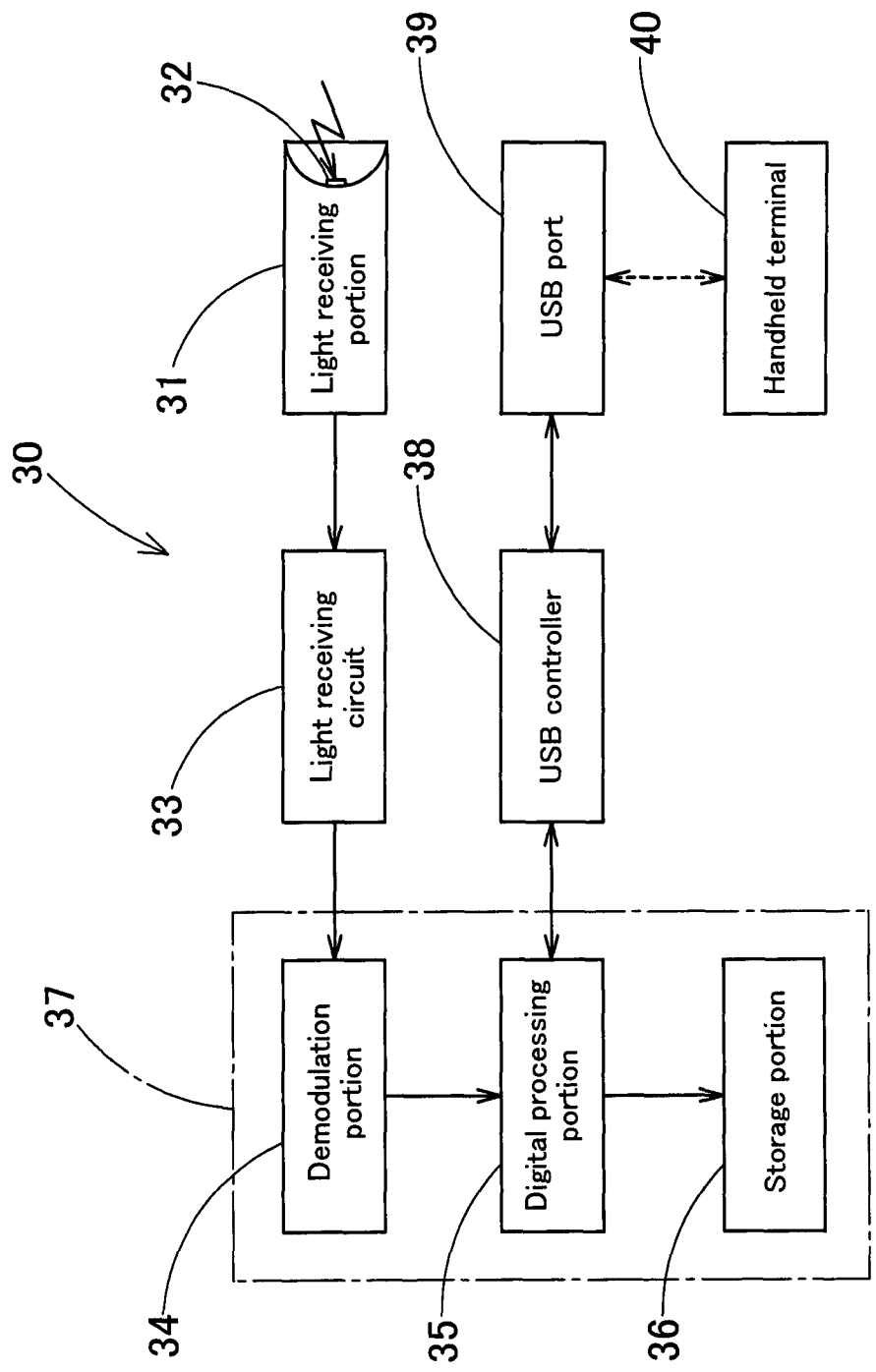
FIG. 8 is a configuration block diagram which shows a spatial light receiver.

On the other hand, the spatial light receiver 30 is used by being connected to the handheld terminal 40 which is carried by a user, and that is, it is connected via a USB (universal serial bus). As shown in FIG. 8, the spatial light receiver 30 is connected to a USB terminal of the handheld terminal 40 as a USB device, and the handheld terminal 40 is used as a USB host device to supply a power source from the handheld terminal 40 to the spatial light receiver 30. Further, as shown in FIG. 8, the spatial light receiver 30 is provided with a USB port 39 to which the handheld terminal 40 is connected and also provided with a USB controller 38 which controls connection via the USB.

The USB controller 38 is, with the USB port 39 connected to the USB terminal of the handheld terminal 40 directly or via a USB cable, functioning as a serial data interface upon supply of a power source. Then, the USB controller 38 reads ID information stored at a storage portion 36 of the spatial light receiver 30 and outputs the ID information to the handheld terminal 40 according to a USB protocol. The spatial light receiver 30 is constituted as a USB host device and a power source is supplied to a handheld terminal which serves as a USB device, by which the handheld terminal functioning only as the USB device can be connected via a USB to output the ID information to the handheld terminal.

The light receiving portion 31 of the spatial light receiver 30 shown in FIG. 8 is provided with a light receiving element 32 such as a photo diode which receives visible light and outputs a light receiving signal, thereby receiving visible light emitted from the light emitting portion 2 of the spatial light transmitter 1 and outputting a light receiving signal. Where an infrared-ray light emitting diode which emits infrared rays (near-infrared light) is used in the light emitting element 3 of the spatial light transmitter 1, an infrared ray photo diode which receives infrared rays as spatial light is used as the light receiving element 32.

The light receiving circuit 33 is connected to the light receiving portion 31. The light receiving circuit 33 uses an amplifier to amplify a subtle light receiving signal output from the light receiving element 32, thereafter, converting the signal to a pulse signal to a level necessary for demodulation through a comparator and outputting the pulse signal to a demodulation portion 34 of the microcomputer 37 after being subjected to waveform shaping through a waveform shaping circuit.

The demodulation portion 34, the digital processing portion 35 and the storage portion 36 are constituted with a one-chip type microcomputer 37. The microcomputer 37 uses the demodulation portion 34 which takes in a pulse signal to demodulate a transmission signal which has been subjected to PPM, thereby converting the transmission signal to a digital signal on the basis of a 4-ary pulse position to obtain ID information sent from the spatial light transmitter 1. The ID information obtaining means of the spatial light receiver 30 is constituted with the above-described light receiving circuit 33, the demodulation portion 34 and the digital processing portion 35.

Where, for example, ASK modulation, FSK modulation or PSK modulation and the like other than PPM is carried out at the transmission signal reproducing portion 7 of the spatial light transmitter 1, the demodulation portion 34 is to carry out demodulation corresponding to ASK modulation, FSK modulation or PSK modulation and the like.

A USB connector portion which functions as a connection portion of the USB port 39 is installed at the spatial light receiver 30 in such a manner as to project outward, for example. The spatial light receiver 30 is connected by inserting the USB connector portion into a USB terminal of a USB port 45 installed at the handheld terminal 40 or via a USB cable. It is possible to downsize the spatial light receiver 30 to, for example, approximately a size of a USB stick memory including the light receiving portion 31 and the microcomputer 37, that is, a size which is much smaller than the handheld terminal 40. Therefore, the spatial light receiver 30 can be used, with the USB connector portion directly inserted into the USB terminal of the handheld terminal 40. In addition, the spatial light receiver 30 can be physically housed inside a case of the handheld terminal 40.

Figure 9:
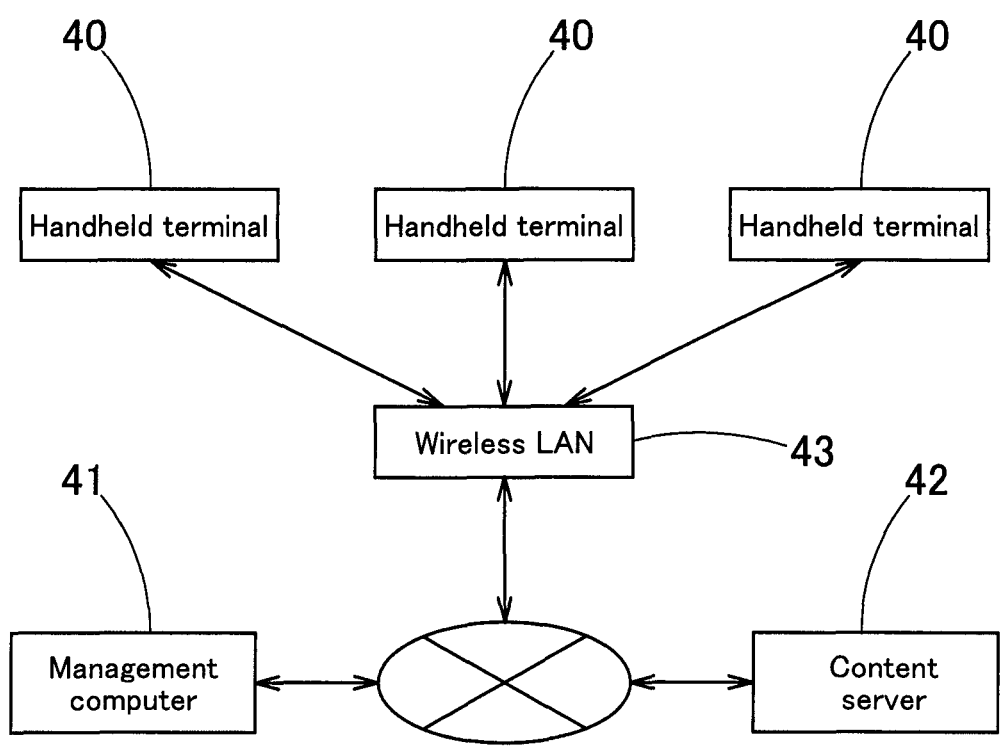
FIG. 9 is a view which explains a network connection of handheld terminals.
Figure 10:
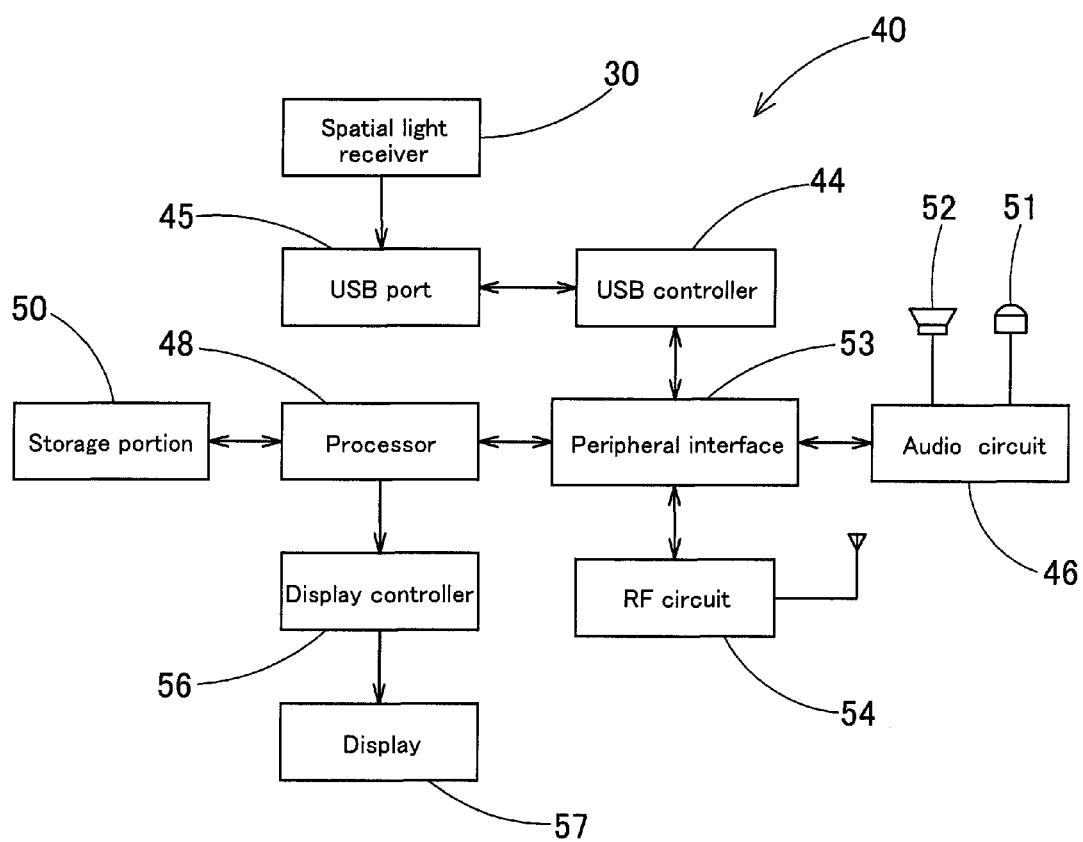
FIG. 10 is a configuration block diagram which shows the handheld terminal.

The handheld terminal 40 includes a PDA (personal digital assistant) and a tablet-type terminal which can be connected to a wireless LAN as well as a mobile phone which can be connected to a mobile phone communication network or a wireless LAN. As shown in FIG. 9, the handheld terminal 40 is connected to a network such as the Internet through the wireless LAN 43. Further, as shown in FIG. 10, the handheld terminal 40 is constituted mainly by a processor 48 composed of a microcomputer. For example, the handheld terminal 40 is provided with a touch sensing display 57 which enables touch input for switch-inputting various functions and displays video, static images, texts, etc., and also provided with a display controller 56 for controlling the touch sensing display 57, a USB port 45 which enables USB connection and a USB controller 44. The handheld terminal 40 is also provided with an RF circuit 54 which is for connection to the wireless LAN or the mobile phone communication network and can be connected to the wireless LAN or the mobile phone communication network through the peripheral interface 53 and the RF circuit 54.

Still further, the storage portion 50 of the handheld terminal 40 stores in advance browser software, audio reproduction software and the like. Thus, the handheld terminal 40 is able to reproduce text, images, video and sounds which have been taken in through a network. The handheld terminal 40 is also to store at the storage portion 50 serving as the content storing means pluralities of content corresponding to the ID information which are downloaded from a content server 42 on a network by using application software. In addition, as shown in FIG. 10, the handheld terminal 40 is provided with an audio circuit 46 and a display 57 for reproducing an audio signal of the content as the content reproducing means. A speaker 52 is connected to an output side of the audio circuit 46, while a microphone 51 is connected to an input side thereof.

The processor 48 of the handheld terminal 40 is to take in ID information sent from the spatial light receiver 30 through the USB port 45, thereby selecting and reading content information inside the storage portion 50 which corresponds to the ID information, reproducing sounds of the content information from the speaker 52 through the audio circuit 46 and displaying content of text, images and video on the display 57 through the display controller 56. Further, the side of the handheld terminal 40 can be constituted so that when the spatial light receiver 30 is connected to the USB port 45, the connection is detected to automatically run software for supplying content on the basis of plug and play.

The RF (radio frequency) circuit 54 of the handheld terminal 40 shown in FIG. 10 includes an antenna system and a tuner, sending or receiving an RF signal, thereby carrying out radio wave communications with access points of wireless LAN connected to the Internet, etc., or base stations of a mobile phone communication network.

As shown in FIG. 9, the handheld terminal 40 is connected to a network such as the Internet via the wireless LAN 43 or a mobile phone communication network, thereby sending or receiving various types of information such as images, video, text and sound information. The content server 42 and a management computer 41 are provided on the network. Content information handled by this system, for example, explanation content information on individual exhibits on display at an art gallery is kept in the content server 42 by using the management computer 41 so as to correspond to the above-described ID information.

In this instance, an administrator uploads the explanation content information prepared in advance using the management computer 41 to the content server 42 and keeps the content information in a non-volatile memory of the content server 42 so as to correspond to the above-described ID information. Then, when access is made from the handheld terminal 40 in order to download the explanation content, the content server 42 reads the content information corresponding to the ID information and delivers the information to the handheld terminal 40.

Where the spatial light transmitter 1 of the above-constituted content supplying system is used in providing explanation content (audio guide) of exhibits on display, for example, in an art gallery or a museum and the like, it is installed at places where the explanation content (audio guide) is provided to users, in the vicinity or the like of exhibits on display in the facilities and the like. At an installation place, an electric-bulb socket is provided so as to face downward, for example, and the spatial light transmitter 1 is attached by screwing the screw fitting 12 into the electric-bulb socket in a state that the light emitting portion 2 is faced downward. Different ID information is set so as to be allocated to each spatial light transmitter 1, and unique ID information is stored at the ID information storage portion 8 of each spatial light transmitter 1.

Usually, a lighting fixture is disposed above the vicinity of the exhibits on display. Where an electric-bulb socket for the lighting fixture is to be used, the spatial light transmitter 1 can be installed at a predetermined place by such simple work that the screw fitting 12 is only screwed into the electric-bulb socket and attached, and the spatial light transmitter 1 can also be connected to a power source.

This is particularly advantageous in the event that spatial light transmitters 1 are installed near individual exhibits on display in an art gallery or a museum where many exhibits on display are installed across a wide area. It is also possible to install spatial light transmitters 1 simply and efficiently.

Where the handheld terminal 40 is lent to and used by a user as an explanation device for exhibits on display, for example, in an art gallery or a museum, explanation content information is taken in advance into each of the handheld terminals 40 so as to correspond to each ID information (ID corresponding to each exhibit on display) and stored at the storage portion 50.

The content information is kept in advance inside the content server 42 on a network, together with the ID information. When an exhibition is held, the handheld terminal 40 is operated to access the content server 42 via the network shown in FIG. 9, and the content information is downloaded into the handheld terminal 40 and used. Thereby, where a new exhibition is held in an art gallery or a museum and the like, at the beginning of the exhibition, the content for explanation concerned is downloaded in advance and kept in the storage portion 50 of the handheld terminal 40, by which the handheld terminal 40 can be used as it is without connecting to the network during the period where the exhibition is held.

In each of the spatial light transmitters 1 in the content supplying system, for example, where facilities such as an art gallery are opened and lights are on, the light emitting portion 2 thereof is operated so as to emit light from above to below in a range of some extent near exhibits on display. And, the spatial light transmitter 1 can be used not only for lighting but also for emitting spatial light for transmission. On transmission by the spatial light transmitter 1, the transmission signal reproducing portion 7 prepares a data frame, as shown in FIG. 7, and places data of ID information on payload and any given additional information into a frame in continuation of the start frame, thereby reproducing a transmission signal.

Further, the transmission signal reproducing portion 7 outputs an information transmission signal by subjecting a sub-carrier wave sent from the sub-carrier wave oscillator 6 to 4-ary PPM, for example, by referring to data containing the ID information on a device. The information transmission signal output from the transmission signal reproducing portion 7 is input into the light emission driving circuit 5. Then, the light emission driving circuit 5 drives the light emitting element 3 of the light emitting portion 2 to emit spatial light (for example, visible light close to white), thereby superimposing the information transmission signal on the spatial light and emitting the light from the light emitting portion 2 downward.

A visitor at an art gallery or a museum and the like carries the handheld terminal 40 and moves while looking at individual exhibits on display. When the visitor comes close to each of the exhibits on display, the light receiving portion 31 of the spatial light receiver 30 connected to the handheld terminal 40 receives spatial light emitted to an exhibit on display as illumination light from the light emitting portion 2 of the spatial light transmitter 1 installed in the vicinity of the exhibit on display.

At this time, the light receiving circuit 33 of the light receiving portion 31 of the spatial light receiver 30 uses an amplifier to amplify a subtle light-receiving signal output from the light receiving element 32, thereafter converting the signal to a pulse signal to a level necessary for demodulation through a comparator. Then, the light receiving circuit 33 outputs the pulse signal to the demodulation portion 34 of the microcomputer 37 after subjecting the pulse signal to waveform shaping through a waveform shaping circuit.

The demodulation portion 34 demodulates a transmission signal which has been subjected to PPM and converts the transmission signal to a digital signal on the basis of a 4-ary pulse position. Then, the spatial light receiver 30 obtains ID information sent from the spatial light transmitter 1. The spatial light receiver 30 stores the obtained ID information in the storage portion 36 and also delivers it to the handheld terminal 40 through the USB controller 38 and the USB port 39.

Upon input of the ID information sent by spatial light from the spatial light receiver 30, the handheld terminal 40 reads the content corresponding to the ID information concerned from the storage portion 50 which is the content storing means, displaying images, video and the like of the content on the display 57 of the terminal, and reproducing an audio signal thereof from the audio circuit 46, thereby outputting sounds from the speaker 52 such as an earphone-type speaker.

Thereby, a user of the handheld terminal 40 is able to listen to explanation (audio guide) on an exhibit on display and look at text, images and the like displayed on the display 57, while looking at the exhibit on display.

On the other hand, where individual exhibits on display are changed due to a change in exhibition and the like and explanation content is to be changed accordingly, an administrator will access the content server 42 on a network by using the management computer 41, thereby updating content information kept at the content server 42 to new content information. As the above-described case, the content information to be newly kept is to be kept at the non-volatile memory of the content server 42 corresponding to the ID information.

Then, at the beginning of displaying exhibits on display which have been changed, each handheld terminal 40 accesses the content server 42 and takes in the changed content information from the content server 42, together with ID information, stores them at the storage portion 50 and updates the content. When a user operates the handheld terminal 40 to use the audio guide, as described above, the user comes close to the spatial light transmitter 1, receives spatial light and obtains the ID information sent from the spatial light receiver 30. When the ID information is sent to the handheld terminal 40 from the spatial light receiver 30, the handheld terminal 40 reads the content corresponding to the ID information from the storage portion 50, displaying content images and the like on the display 57, reproducing and processing an audio signal by the audio circuit 46, thereby outputting sounds from the speaker 52. Depending on the usage method of the handheld terminal 40, the handheld terminal 40 is able to reproduce text, images, video, etc., of the content which has been downloaded from the content server 42, as it is, by specifying the ID information upon input of the ID information.

Further, in another embodiment, it is possible to store the content information in the content server 42 on a network so as to correspond to the ID information as control information such as information on activation of application software and information on change in setting. In this instance, the handheld terminal 40 obtains the control information from the content server 42 on the basis of the ID information, thereby controlling activation, change in setting and the like of the application software operable inside the handheld terminal on the basis of the control information.

Where application software of a telephone directory is stored at the handheld terminal 40, for example, as application software, ID information is taken in as activation information thereof, by which the application software of a telephone directory is activated to make a phone call to a set person. Alternatively, where the application software is map application software and the activation information thereof is taken in as ID information, the map application software is activated to display a map which is set on a display portion of the handheld terminal 40.

On the other hand, where demonstration software of advertisements for merchandise is, for example, provided to a user as content information reproducible by the handheld terminal 40, the merchandise demonstration software is kept at the content server 42 and downloaded on access by the handheld terminal 40. Thereby, the handheld terminal 40 can be used to immediately reproduce the content thereof at the time of download of the merchandise demonstration software.

That is, for example, where automatically reproducing demonstration video of advertisements for merchandise as content information at specific places such as various types of shops, booths and exhibition sites when visited by customers is desired, ID information is sent by being superimposed on spatial light from the spatial light transmitter 1 installed at a specific place. When a customer having the handheld terminal 40 visits a shop, the spatial light receiver 30 connected to the handheld terminal 40 obtains the ID information transmitted by being superimposed on spatial light and sends the ID information to the handheld terminal 40. Then, the handheld terminal 40 accesses the content server 42 through the wireless LAN 43 or a mobile phone communication network and downloads the demonstration software of advertisements for merchandise from the content server 42 on the basis of the ID information, thereby reproducing and displaying the text, images, video, sounds and the like.

Further, in another embodiment, it is also possible to store the content information at the content server 42 on a network so as to correspond to ID information as a URL of content reference information. In this instance, the handheld terminal 40 obtains the URL of content reference information from the content server 42 on the basis of the ID information. Then, the handheld terminal 40 accesses another server to be referenced on the network on the basis of the URL of content reference information, collecting a main body of content information from the server to be referenced, temporarily storing the main body of content information at the storage portion 50 so as to correspond to the ID information, thereby displaying the content on a screen or reproducing sounds.

As described above, even where the content information corresponding to the ID information is not content in itself but a URL of content reference information, the handheld terminal 40 inputs the URL of content reference information from the content server 42 on the basis of the ID information, accessing another server to be referenced of the corresponding URL, thus making it possible to collect and reproduce the main body of content information such as text, images, video, application software and the like on the server to be referenced.

As described above, when the spatial light receiver 30 receives the ID information sent by being superimposed on spatial light, with the ID information used as a trigger, the handheld terminal 40 is capable of reproducing the content in itself stored in advance at the storage portion 50 so as to correspond to the ID information, taking in the content information into the content server 42 by access and carrying out functions of accessing a server to be referenced by referring to a URL on a network or activation of application software corresponding to the ID information and other associated functions.

Further, information which is transmitted by spatial light from the spatial light transmitter 1 to the spatial light receiver 30 of each handheld terminal 40 is substantially only ID information. Therefore, as compared with the case of transmission of the content information as it is, the information can be transmitted instantaneously. Both the spatial light transmitter 1 and the spatial light receiver 30 can be made simple in circuit configuration and downsized. Still further, they are less likely to be influenced by noise and the like on transmission and also able to provide appropriate content quickly.

Figure 11:
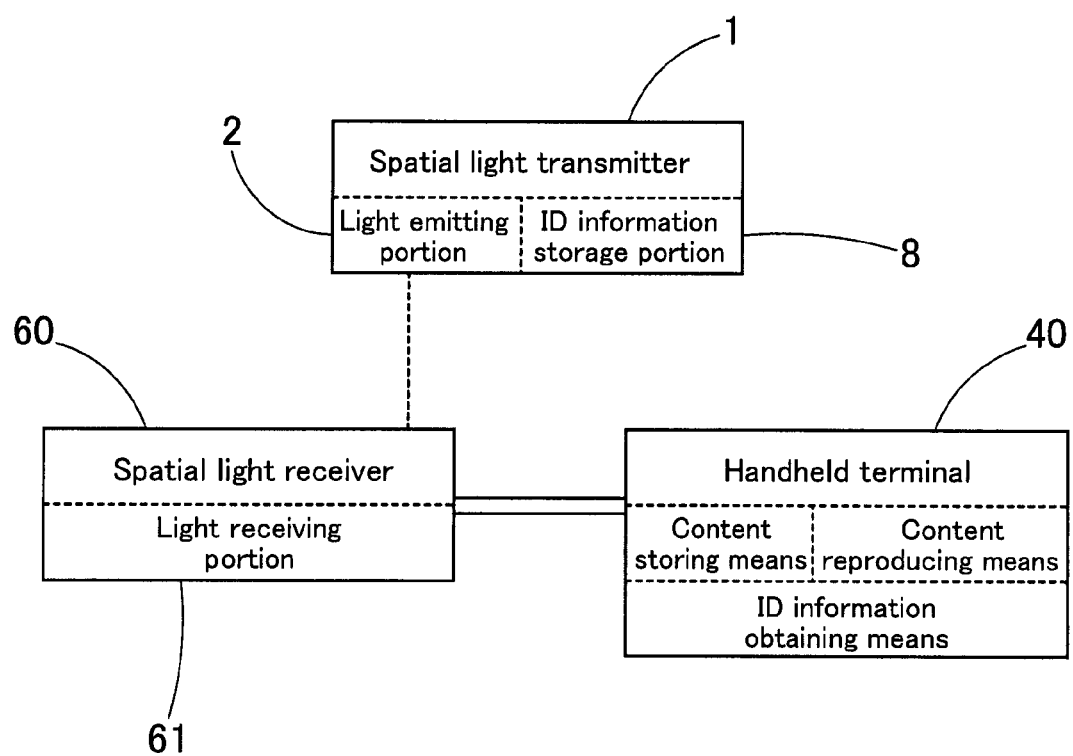
FIG. 11 is a configuration diagram which shows a content supplying system of another embodiment.
Figure 12:
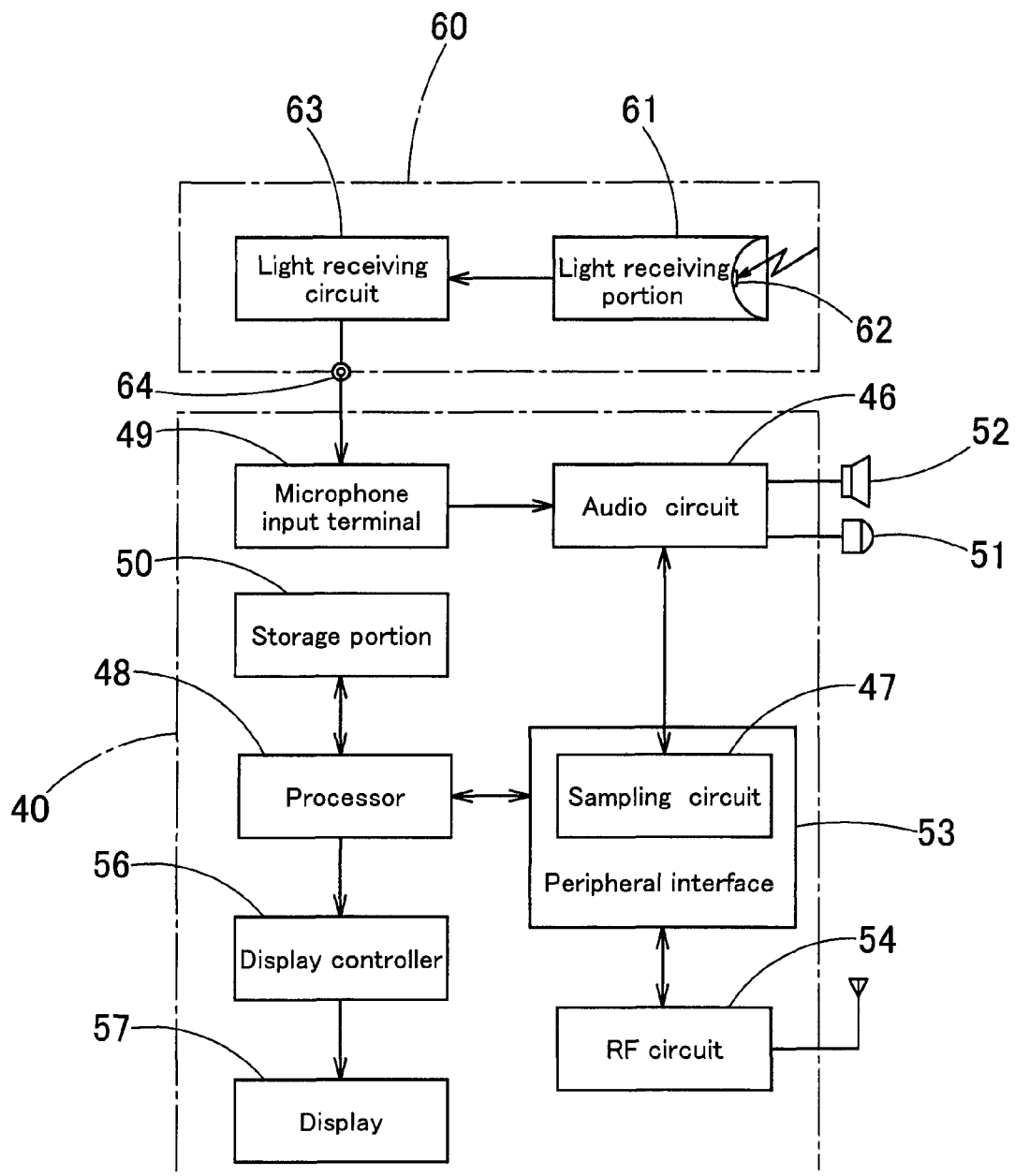
FIG. 12 is a configuration block diagram which shows a spatial light receiver of another embodiment.

FIG. 11 is a configuration diagram which shows a content supplying system of another embodiment. FIG. 12 is a configuration diagram which shows a spatial light receiver 60 and a handheld terminal 40 of the system. ID information obtaining means of the content supplying system is installed at the handheld terminal 40, and the spatial light receiver 60 is constituted so as to output an analog audio signal containing ID information to the handheld terminal 40. As shown in FIG. 12, the spatial light receiver 60 is constituted with a light receiving portion 61 which has a light receiving element 62 for receiving spatial light and a light receiving circuit 63 for amplifying the light receiving signal.

The light receiving element 62 is composed of a photo diode or the like which receives spatial light such as visible light to output a light receiving signal, thereby receiving spatial light emitted from the light emitting portion 2 of the spatial light transmitter 1 and outputting the light receiving signal to the light receiving circuit 63. The light receiving circuit 63 uses an amplifier to amplify a subtle light receiving signal output from the light receiving element 62 and outputs a light-receiving analog signal (audio signal) as it is from an output terminal 64 to a microphone input terminal 49 of the handheld terminal 40. The output terminal 64 of the spatial light receiver 60 is connected to the microphone input terminal 49 of the handheld terminal 40 by way of a general-use connection cable or a microphone plug and a connector. Where the microphone input terminal 49 of the handheld terminal 40 is formed as a connector portion integral with an earphone terminal, the handheld terminal 40 is used by connecting only the microphone input terminal of the connector portion.

As shown in FIG. 12, the handheld terminal 40 inputs a light receiving signal sent through the light receiving circuit 63 from the microphone input terminal 49 and amplifies the signal by an audio circuit 46. Thereafter, the handheld terminal 40 samples an analog signal thereof by using a sampling circuit 47 and converts the signal to a digital value. The sampling circuit 47 is installed inside a peripheral interface 53. As with the above case, an RF circuit 54 for the wireless LAN or a mobile phone communication network is connected to the peripheral interface 53. The processor 48 of the handheld terminal 40 obtains ID information by demodulating, for example, a 4-ary PPM signal from the digital value sampled by the sampling circuit 47. Where there is carried out, for example, ASK modulation, FSK modulation or PSK modulation and the like other than PPM at the transmission signal reproducing portion 7 of the spatial light transmitter 1, a CPU 48 carries out demodulation corresponding to ASK modulation, FSK modulation or PSK modulation and the like.

When the handheld terminal 40 to which the spatial light receiver 60 is connected is used to provide users with content information, the light receiving portion 61 of the spatial light receiver 60 receives spatial light sent from the spatial light transmitter 1, by which a light receiving signal is output from the light receiving circuit 63. The light receiving signal is an analog audio signal which contains ID information and input from the spatial light receiver 60 to the microphone input terminal 49 of the handheld terminal 40. The processor 48 of the handheld terminal 40 samples the thus input analog signal containing ID information by using software at a predetermined cycle and converts the analog signal to a digital value. Further, the processor 48 demodulates a 4-ary PPM signal which is the digital value by software and obtains the ID information.

The above-described software is stored in advance at the storage portion 50 of the handheld terminal 40 as application software. The handheld terminal 40 is capable of activating the application software upon connection to the spatial light receiver 60, sampling the analog audio signal input from the spatial light receiver 60, demodulating the 4-ary PPM signal obtained by the sampling and obtaining the ID information. The handheld terminal 40 selects and reproduces content information on the basis of the thus obtained ID information.

As described above, the spatial light receiver 60 which is connected to a microphone input terminal is used, by which the processor 48 demodulates a 4-ary PPM signal by software, and the handheld terminal 40 obtains the ID information from a light receiving signal containing the ID information which is input through the microphone input terminal 49.

Accordingly, the spatial light receiver 60 is composed of only the light receiving portion 61 and the light receiving circuit 63 and quite simple in circuit configuration. Thus, the spatial light receiver 60 as hardware can be downsized to a remarkable extent.

Further, as the handheld terminal 40, an existing handheld terminal having the microphone input terminal 49 can be used as it is. The spatial light receiver 60 small in dimension and simple in configuration is connected to and application software for obtaining and processing the ID information is installed at the handheld terminal 40, thus making it possible to easily and conveniently fabricate the content supplying system. Still further, since the spatial light receiver 60 composed of the light receiving portion 61 and the light receiving circuit 63 is constituted so as to be small in dimension, it can be easily housed inside the handheld terminal 40.

If a light-receiving voltage signal favorable in S/N (signal-to-noise) ratio is obtained upon receipt of light by the light receiving element 62 of the light receiving portion 61 and ID information can be extracted from the light receiving signal on the side of the handheld terminal 40, an amplifier for amplifying the light receiving signal is not necessarily required. Therefore, where the light-receiving voltage signal of the light receiving element 62 is obtained at an S/N ratio to as high an extent as possible in obtaining the ID information, light receiving circuit 63 is not required. And, an audio circuit 46 of the handheld terminal 40 is able to take in the effective light receiving signal even by directly connecting, for example, the anode and the cathode of the light receiving element 62 to the microphone input terminal 49.

Further, where, for example, the microphone input terminal 49 of the handheld terminal 40 is constituted as an input terminal of a dynamic microphone which does not need a power source and no direct-current power source is supplied from the handheld terminal 40, it is desirable that the spatial light receiver 60 has the light receiving element 62 which uses a light receiving element capable of obtaining a light-receiving voltage signal favorable in S/N ratio. In this instance, the light receiving circuit of the spatial light receiver 60 is constituted so that a direct-current power source supplied externally is not necessary. And, an electromotive force of a signal of the light receiving element 62 is used to activate the light receiving circuit 63, thereby inputting an effective analog signal to the microphone input terminal 49. Alternatively, the spatial light receiver is constituted only with the light receiving element, by which the light receiving signal can be directly input to the microphone input terminal 49 of the handheld terminal 40.

Figure 13:
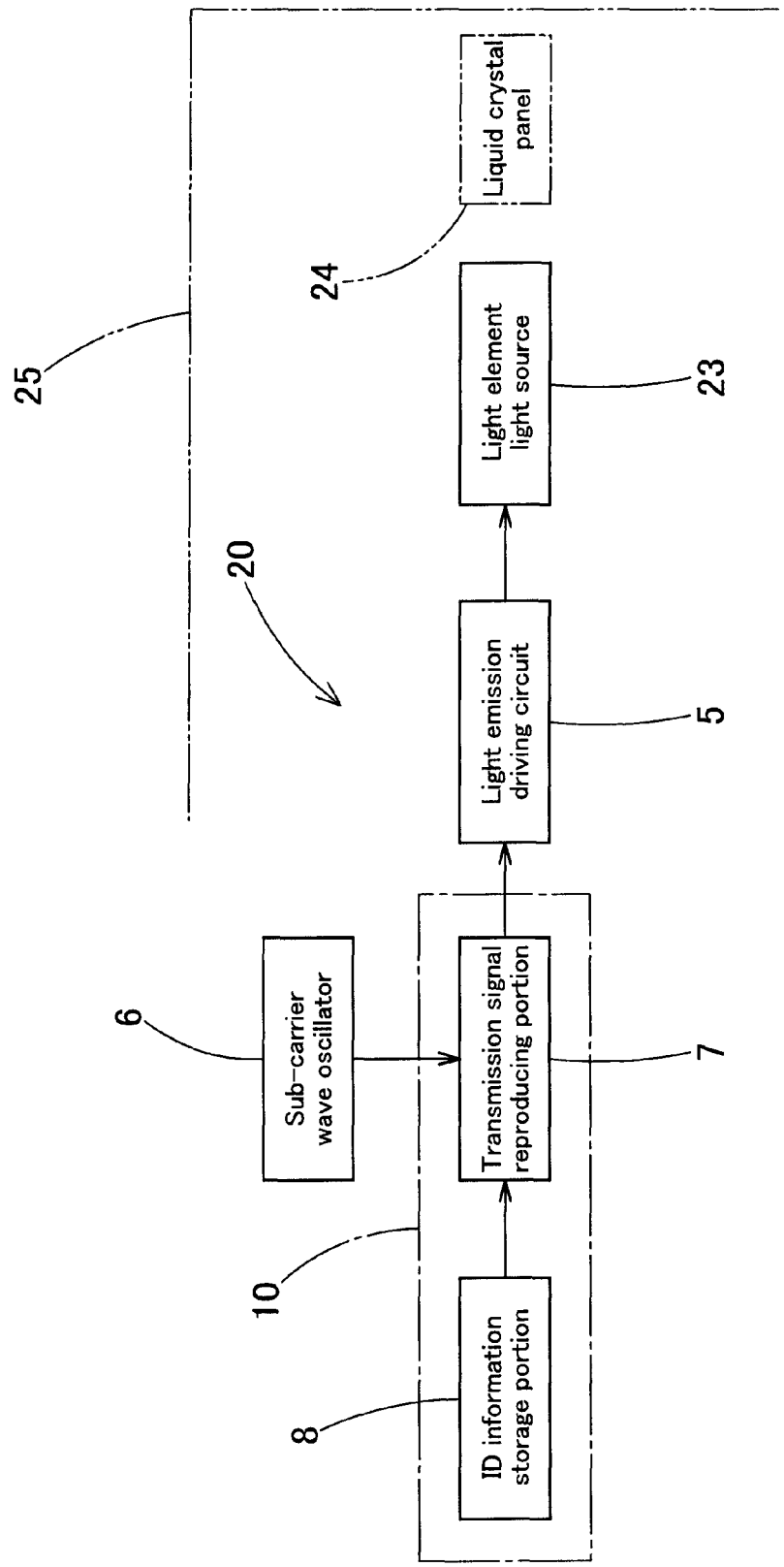
FIG. 13 is a configuration block diagram which shows a spatial light transmitter of another embodiment.

FIG. 13 shows a spatial light transmitter 20 of still another embodiment. Constituents which are the same as those of the spatial light transmitter 1 shown in FIG. 6 are given the same reference numerals in FIG. 13, with a description thereof omitted here. This spatial light transmitter 20 is housed inside a liquid crystal display device 25 which displays various images and video.

In the liquid crystal display device 25, a light element light source 23 which serves as back light is disposed at the back side of a liquid crystal panel 24. The light element light source 23 as the back light functions as a light emitting portion of the spatial light transmitter 20. The liquid crystal display device 25 is installed at, for example, various event sites or in public facilities, etc., thereby displaying various types of information and the like for visitors arriving there. A white-light emitting diode which irradiates white light, an organic EL element and the like can be used as the light element light source 23.

The light element light source 23 of the liquid crystal display device 25 is connected to the output side of a light emission driving circuit 5 of the spatial light transmitter 20. The light emission driving circuit 5 inputs an information transmission signal which contains the modulated ID information sent from a transmission signal reproducing portion 7 of a microcomputer 10, driving the light element light source 23 to emit visible light and also superimposing the information transmission signal on the visible light. The light element light source 23 functions as the back light of the liquid crystal panel 24. Thus, during display operation of the liquid crystal display device 25, the visible light on which the ID information is superimposed is irradiated in front of the liquid crystal panel 24.

When a user holds a handheld terminal 40 and moves in front of the liquid crystal display device 25, a light receiving portion 31 of a spatial light receiver 30 connected to the handheld terminal 40 receives visible light as the back light of the display which is irradiated from the light element light source 23 of the liquid crystal display device 25 which houses inside the spatial light transmitter 20.

At this time, as described in FIG. 8, a light receiving circuit 33 of the light receiving portion 31 of the spatial light receiver 30 uses an amplifier to amplify a subtle light receiving signal output from the light receiving element 32, thereafter, converting the signal through a comparator to a pulse signal to a level necessary for demodulation. The pulse signal is subjected to waveform shaping through a waveform shaping circuit and, thereafter, output to a demodulation portion 34 of a microcomputer 37.

The demodulation portion 34 demodulates a transmission signal which has been subjected to PPM, converting the transmission signal to a digital signal on the basis of a 4-ary pulse position, storing ID information of the received spatial light transmitter 1 at a storage portion 36, and also outputting the ID information to the handheld terminal 40 through a USB controller 38 and a USB port 39.

Alternatively, a spatial light receiver 60 shown in FIG. 12 uses a light receiving circuit 63 to amplify a light receiving signal received from a light receiving portion 61 and sends the amplified light receiving signal containing ID information to the handheld terminal 40 through an output terminal 64 and a microphone input terminal 49.

The handheld terminal 40 inputs the ID information sent by spatial light from the spatial light receivers 30, 60 or demodulates the light receiving signal to obtain the ID information. Then, the handheld terminal 40 reads the content information corresponding to the ID information from the storage portion 50 or accesses the content server 42 to obtain the content information, displaying the content on a display 57 of the handheld terminal 40 and reproducing sounds thereof.

Further, where the content information corresponding to the ID information is a URL of content reference information, the handheld terminal 40 accesses another server to be referenced on the basis of the URL and obtains the content information, thereby displaying content images and the like on the display 57 of the terminal. Also, the handheld terminal 40 reproduces an audio signal thereof by using an audio circuit 46, thereby outputting the sounds from an earphone-type speaker 52. Thereby, a user of the handheld terminal 40 is able to look at and listen to explanation and guidance (audio guide) and the like, for example, on a screen displayed by the liquid crystal display device 25 through the handheld terminal 40.

What is claimed is:

1. A content supplying system which uses spatial light transmission comprising:
    a spatial light transmitter which is provided with an ID information storage portion for storing ID information of its own and also provided with a light emitting portion for emitting spatial light on which the ID information is superimposed;
    a handheld terminal which is provided with content storing means for storing content information so as to correspond to the ID information and also provided with content reproducing means for reproducing content read from the content storing means as text, images, video or sounds; and
    a spatial light receiver which is connected to the handheld terminal and provided with a light receiving portion for receiving spatial light emitted from the light emitting portion of the spatial light transmitter, wherein
    ID information obtaining means for obtaining the ID information which is transmitted by being superimposed on spatial light from a light receiving signal of the light receiving portion is installed at the spatial light receiver or the handheld terminal, and
    wherein the handheld terminal is in communication with the spatial light transmitter, and the light receiving portion of the spatial light receiver receives spatial light emitted from the spatial light transmitter, the ID information obtaining means obtains the ID information which is superimposed on spatial light from the light receiving signal of the light receiving portion, and the content reproducing means of the handheld terminal reproduces a content selected on the basis of the ID information, and
    the spatial light receiver is provided with a light receiving circuit for inputting a light receiving signal of the light receiving portion and an output terminal for outputting the light receiving signal from the light receiving circuit, the output terminal of the spatial light receiver is connected to a microphone input terminal of the handheld terminal, and the ID information obtaining means installed at the handheld terminal inputs the light receiving signal containing ID information through the microphone input terminal, thereby extracting and obtaining the ID information from the light receiving signal.

2. The content supplying system which uses spatial light transmission according to claim 1, wherein
    the content information is stored at a content server on a network so as to correspond to the ID information, and the handheld terminal accesses the content server to collect content information, thereby storing the content information at the content storing means so as to correspond to the ID information.

3. The content supplying system which uses spatial light transmission according to claim 2, wherein
    the content information is stored at the content server on the network so as to correspond to the ID information as control information, wherein
    the control information includes information on activation of application software which operates on the handheld terminal.

4. The content supplying system which uses spatial light transmission according to claim 2, wherein
    the content information is a URL of content reference information and is stored at the content server on the network so as to correspond to the ID information, and the handheld terminal obtains the URL of content reference information from the content server according to the ID information and accesses a server to be referenced on the network on the basis of the URL of content reference information, thereby collecting a main body of content information from the server to be referenced.

5. The content supplying system which uses spatial light transmission according to claim 1, wherein
the spatial light receiver is provided with a USB port, the spatial light receiver is connected to the handheld terminal by way of a USB, and when the ID information obtaining means installed at the spatial light receiver receives and obtains the ID information sent by being superimposed on spatial light from the spatial light transmitter, the ID information is output to the handheld terminal through the USB port.

6. The content supplying system which uses spatial light transmission according to claim 1, wherein
the spatial light transmitter is provided at one end of a main body case with a light emitting portion which emits spatial light from a light emitting element, inside the main body case, wherein the spatial light transmitter comprises:
a light emission driving circuit for activating the light emitting element so as to emit light;
the ID information storage portion for storing ID information in advance on the spatial light transmitter or an installation place thereof;
a transmission signal reproducing portion for modulating a carrier wave by an information signal which contains at least the ID information, reproducing a transmission signal and outputting the signal to the light emission driving circuit; and
a power source circuit which inputs electricity supplied through a screw fitting of an electric bulb as a power-source input portion to supply direct-current electricity to the light emission driving circuit and the transmission signal reproducing portion; and
the screw fitting of the electric bulb is attached to another end of the main body case as the power-source input portion.

7. The content supplying system which uses spatial light transmission according to claim 6, wherein
the transmission signal reproducing portion is provided with a carrier wave oscillator for oscillating a high-frequency signal of a carrier wave and a modulation portion for modulating the carrier wave by an information signal containing the ID information.

8. The content supplying system which uses spatial light transmission according to claim 1, wherein
the spatial light receiver is housed inside the handheld terminal.

9. The content supplying system which uses spatial light transmission according to claim 1, wherein
the spatial light transmitter is housed inside a liquid crystal display device having a light element light source on a liquid crystal panel, the light element light source of the liquid crystal display device is used as a light emitting element of a projector of the spatial light transmitter, there is supplied to a light emission driving circuit of the light element light source a transmission signal in which ID information read from the ID information storage portion which stores the ID information of its own is modulated, and visible light irradiated from the light element light source is emitted, with the transmission signal superimposed thereon.

\* \* \* \* \*